Dec. 9, 1947.　　A. R. WILLIAMS　　2,432,107
AMPHIBIAN VEHICLE
Filed Dec. 30, 1942　　2 Sheets-Sheet 1

Inventor
Allison R. Williams

By

Attorneys

Dec. 9, 1947.      A. R. WILLIAMS      2,432,107
                   AMPHIBIAN VEHICLE
          Filed Dec. 30, 1942      2 Sheets—Sheet 2

Inventor
Allison R. Williams

By

Attorneys

Patented Dec. 9, 1947

2,432,107

UNITED STATES PATENT OFFICE 2,432,107

AMPHIBIAN VEHICLE

Allison R. Williams, Yazoo City, Miss.

Application December 30, 1942, Serial No. 470,615

16 Claims. (Cl. 115—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to armored vehicles and more particularly to vehicles of the amphibian type. In its specific aspects the invention is directed to amphibian vehicles of high maneuverability adapted to attack and destroy military tanks and provided with a plurality of independent self-contained power units for driving the same.

Military tanks are well designed and well developed. Up to comparatively recent times, reliance has been made upon the tanks themselves as a means of attacking and destroying other tanks. However, tanks, because of their extreme weight and vulnerable driving mechanism, are relatively difficult to maneuver. Where they are driven by caterpillar treads they are vulnerable to explosive shells fired from anti-tank guns. Most types are also handicapped by inability to operate in water, and therefore necessitate the use of special ferrying equipment for transport across bodies or streams of water. They are inherently inefficient in their operation because for the most part the engines are driven at high speed, and control of the vehicle is accomplished by dissipation of power through braking mechanism.

Because of the deficiencies of tanks, as pointed out above, attempts have been made to provide mobile tank destroying equipment in the form of an anti-tank gun carried on a vehicle trailer or mounted on a truck. It has also been proposed to use a hybrid construction of motor vehicle and caterpillar drive, or to mount the guns on a tank chassis. Such devices are subject either to the deficiencies of tanks enumerated above because of the presence of the caterpillar treads, or are made vulnerable by leaving the operating personnel exposed to enemy gunfire.

The present invention aims to avoid the difficulties which are characteristic of the tank and to provide a tank destroyer which is highly maneuverable, efficient, capable of protecting the operating personnel against enemy gunfire, and so arranged that its driving mechanism is well protected against damage. The proposed result is achieved by making the power plant in a plurality of self-contained well armored units, operating independently and so disposed that damage to as many as two of the units will still leave the other units free to propel and maneuver the vehicle. Furthermore, the power units are of such a character that the vehicle may operate either on land or in water, thus avoiding the use of ferrying or bridging equipment when crossing water, and overcoming one of the most serious disadvantages of the conventional tank.

The vehicle is also characterized by the fact that the location of the individual power plants is such as to give the vehicle a very low center of gravity, making it highly stable and maneuverable and inherently resistant to the recoil of the gun or guns which it carries.

Numerous objects and advantages of the invention will appear from the following description when it is read in connection with the accompanying drawings, in which.

Figure 1:
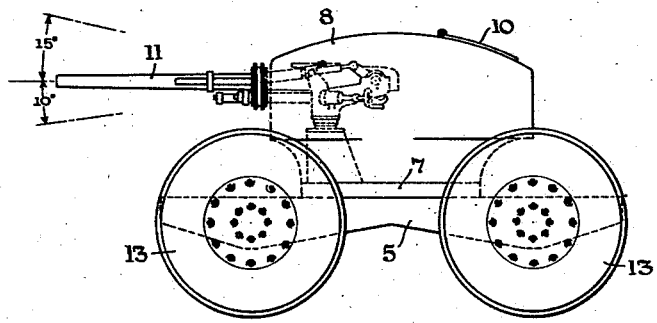
Figure 1 is a side elevation of a vehicle embodying the present invention, with many of the structural details omitted.

The general character of the vehicle will be evident from Fig. 1. As there shown, the low-sung chassis or frame composed of side frames 5 and end members 6 supports a base plate 7. Movably mounted on the base plate is a closed turret 8 of streamlined character and designed to present a series of exposed curved surfaces for deflecting projectiles which may strike it. This turret which is capable of being swiveled through 180, or even 360 degrees, about a central axis on base plate 7 by suitable gearing 9, is designed to house and protect not only the offensive equipment but also the operating personnel of the vehicle. Entrance to the turret may be had through any suitable opening such as that indicated at 10 in Fig. 1.

The turret carries armament represented by anti-tank gun 11 which is preferably constructed to have vertical movement as indicated, and also horizontal movement to provide for fine adjustment after a coarse adjustment has been made by rotation of the turret. While a single gun is shown, it is obvious that a plurality of guns may be employed and that they can be constructed to be effective against aircraft as well as against tanks and other ground vehicles.

Figure 2:
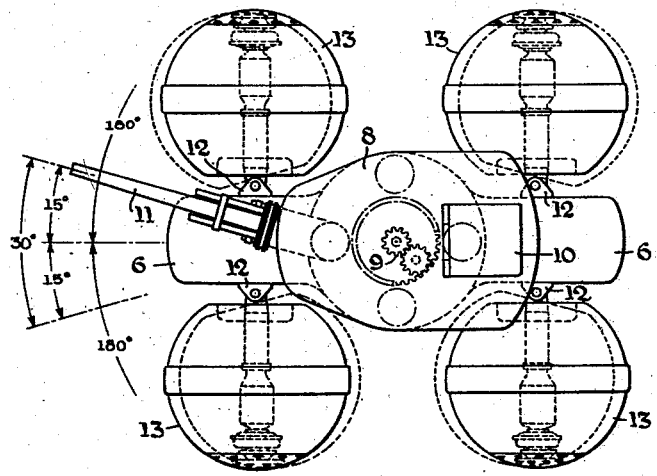
Figure 2 is a plan view of the vehicle of Fig. 1 indicating the location of the power plant units and the disposition of the gun with respect to the rotatable turret carried on the vehicle chassis.

As shown in Fig. 2, the chassis carries wheel mounting brackets 12 adapted for pivotal connection to bulbous or spherical wheels 13, each of these wheels being constructed as a self-contained power plant unit capable of individual drive and control. The steering mechanism can conform to any known system and hence is not shown. Turning movement of the vehicle can be assisted by control of the various engines, that is by speeding up the engine on the outside wheels during a turn and slowing down the inside wheels. A "joystick" control such as is used on aircraft may be adopted to coordinate the control of the various units during turning movements.

As shown in the drawing, the spherical wheels are watertight, and are arranged in such manner that the controls for the engines and clutching mechanism, as well as the motor starting means, may be led from the chassis and through the brackets 12, by sealed tubing so as to avoid all danger of flooding the unit when the vehicle is operating in water.

Figure 3:
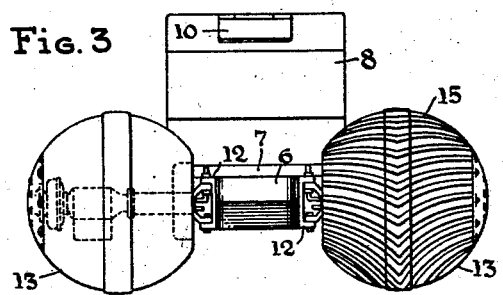
Figure 3 is a rear elevation of the vehicle.

Fig. 3 illustrates how the outside surface of the wheels may carry integral driving cleats or fins 15 which will be effective to provide traction on soft ground or to serve as propeller blades when the vehicle is in water.

Figure 4:
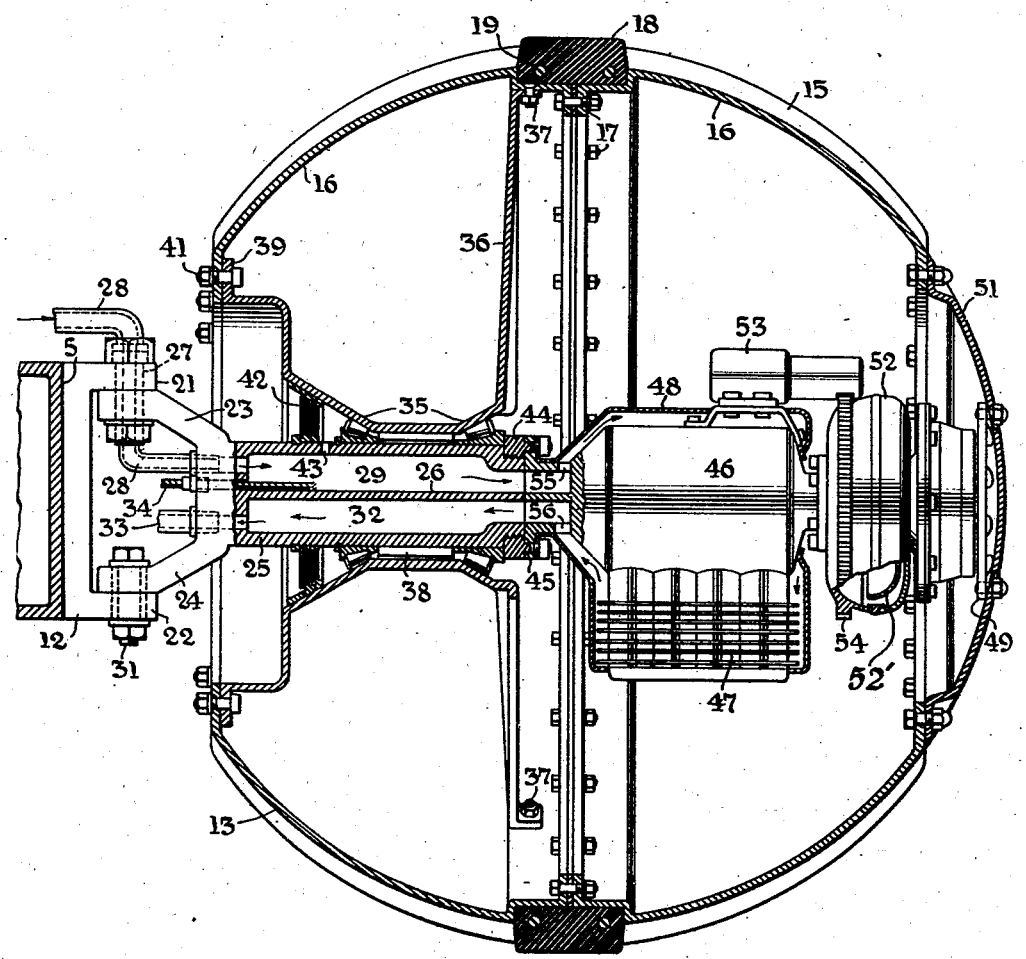
Figure 4 is a vertical sectional view of one of the power plant units showing its disposition within a totally enclosed spherical wheel connected to the power plant unit through a fluid torque converter.

In actual practice it will be understood that various types of wheel driving mechanism may be adopted, but for the purpose of illustration, one type of mechanism is shown in Fig. 4 of the drawings to which reference will now be had. As indicated, the spherical wheel will preferably be made up of two similar, substantially hemispherical steel shells 16 adapted to be bolted together as at 17, and to form a tread groove which receives and supports a central peripheral rubber tread member 18 projecting beyond the steel shell. This tread will furnish a broad supporting means, making it possible to operate the vehicle on paved highways without damaging the same, and yet will not interfere in any way with the driving action of the fins when the vehicle is on soft ground. The tread member will preferably contain beadwires 19 to hold it in position. Each wheel unit together with its power plant is carried by one of the brackets 12 attached to the vehicle chassis.

As indicated in Fig. 4, the bracket 12, which is bolted to the chassis terminates in two spaced lugs 21 and 22 pivoted to the forks 23 and 24 of a tubular axle 25. The axle 25 is divided longitudinally by an insulating partition 26 which separates the inlet to and the exhaust from the engine as will be pointed out later on in this description.

A hollow king pin 27 connects lug 21 to fork 23 and serves with a pipe 28 passing through it, to complete a lead-in connection to the inlet chamber 29 of axle 25. A solid king pin 31 connects lug 22 to fork 24, and exhaust pipe 33 leads from exhaust chamber 32 of axle 25. The pipe 28 serves to supply air under pressure to inlet chamber 29 and thence to the engine. This air supply serves not only as a ventilating medium but also as a supply for the fuel mixture. The cable designated generally by reference character 34 may lead to the starting motor, the engine throttle and other elements which require outside control. As shown these controls preferably pass through the inlet chamber 29.

The wheel is attached to the axle 25 by means of a casting 35 terminating in a spider having radial arms 36 which are bolted to the periphery of the shell at 37. Suitable roller bearings 38 are provided between the casting 35 and the axle 25, the casting terminating at its inner end adjacent the vehicle chassis in a bolting flange 39 which is enlarged to provide the necessary clearance between the parts and is bolted at 41 to the shell 16. This enlargement may accommodate any conventional braking mechanism (not shown). The spider arms 36 serve to stiffen the wheel shell structure and to prevent it from sagging. The space around the roller bearings is sealed from the outside air by a labyrinth packing 42 designed to prevent entrance of water to the bearings and thence into the interior of the wheel, and for this purpose is supplied with air under pressure from chamber 29 through openings 43 in axle 25.

The outer end of the axle 25 carries a removable bolting flange 44 threaded onto it so as to provide means for positioning the roller bearings. As shown this flange carries integral bolts for cooperation with suitable openings in a bolting flange 45 on engine 46. Preferably and as shown, the cylinders of the engine extend downwardly in underslung relation to the wheel axis so as to give the power plant a very low center of gravity, and even below the chassis. The location of the center of gravity will obviously vary with the structure employed, but in any event will be considerably below that possible with wheeled vehicles of conventional types. As shown also, the engine is of the air-cooled type, the cylinders carrying cooling vanes 47 and air directing shrouds 48. The engine is disposed in driving relation to a plate 49 carried by the wheel cover 51 by means of a transmission mechanism, preferably in the form of a hydraulic torque converter well known in the art having the usual housing 52 attached to the crank shaft of the power plant and the impeller 52' to the plate 49. Use of a fluid torque converter is preferred because it permits starting the engine with the vehicle at rest, and the impeller drives only at speeds above the critical speeds. This arrangement provides desirable flexibility of control, eliminates conventional clutch and gear shift mechanism, and otherwise simplifies construction and maintenance. By equipping the engine with an automatic spark control the number of controls for the engine may be reduced to two, that is the throttle control and the starting motor control. Reference character 53 designates a starting motor which is connected to the usual ring gear 54 on the torque converter housing. The cover 51 is removable to provide access to the interior of the wheel.

In the foregoing description, it is indicated that the inlet and exhaust chambers 29 and 32, respectively, are separated by an insulating partition 26. With this arrangement, inlet air for the carburetor of the engine may enter through the pipe 28, chamber 29, and opening 55, to the interior of shroud 48, and thence to the carburetor (not shown) of the engine. The exhaust gases will be discharged through opening 56 into the exhaust chamber 32 and thence through exhaust pipe 33. This pipe is shown broken away but in practice it will discharge above any possible water level in which the vehicle may maneuver.

The space within shroud 48 is connected to the exhaust chamber 32 through opening 56 so that the shroud 48 is designed to receive and direct not only inlet air for the carburetor of the engine, but also ventilating air for cooling the engine and assisting in the discharge of exhaust gases. For this purpose, there is preferably disposed within the chassis of the vehicle, a blower or other source of air under pressure, having its discharge connected to the pipe 28 so as to circulate a considerable volume of air over and above that required to form the fuel mixture for the engine.

This air under pressure, therefore, places the inlet chamber 29 under a pressure in excess of atmosphere, so that air is not only led through the opening 55 to the engine shroud but also escapes through peripheral openings 43 in the axle 25 through the labyrinths of packing 42 to the atmosphere. Consequently, the pressure inside of the labyrinth always exceeds that on the outside and prevents the entrance of water when the engine is operating in water at a depth sufficient to reach the wheel bearing.

It will be observed that the hydraulic torque converter provides a smooth and flexible driving connection and simplifies the construction and operation of the mechanism. The provision of the insulating partition 26 within the axle 25 and the supply of blower air ensures adequate temperature differential between inlet air and exhaust gases for efficient operation of the power plant.

The operation of the vehicle just described will be apparent without detailed description. The preferred use of the mechanism is for hunting down and destroying enemy tanks, it being proposed for this purpose that several of these anti-tank vehicles shall operate in concert, according to pre-arranged plan so as to attack and fire on the tank or tanks from several angles simultaneously.

The disposition of the power plant units within the heavy steel shells near to the ground renders them secure against small caliber bullets, such as machine gun bullets, and the like, and the curved contour of the shell forms a deflecting surface for bullets, shrapnel and bomb or grenade fragments. Since there are four individual self-contained power plant units for each vehicle, one or two of these units can be disabled without immobilizing the vehicle. This is an important advantage over the caterpillar type of drive, in which destruction of a single tread on the vehicle definitely immobilizes it, and places it and its operating personnel in a vulnerable position.

Vehicles of the present invention offer the advantage that the power plant units can be interchangeable, and that should one or more of the units of one vehicle be damaged, an operative power unit from another vehicle could be used to replace it. Thus, so long as two front, or two rear units are operative the vehicle can maneuver. In warfare, at locations remote from repair stations, this is an advantage which is not present in a fighting unit which is dependent upon a single central source of power.

When the vehicle steering is assisted by control of the engines, quick and sharp maneuvering of the vehicle becomes possible and this movement is assisted by the fact that the heavy portions of the vehicle are disposed near to the ground, providing a resultant very low center of gravity, thus materially improving the stability of the vehicle in resisting the overturning tendency occasioned by the recoil of guns of anti-tank or anti-aircraft caliber.

Although no specific dimensions are given, it is preferred that the turret of the vehicle shall be arranged to accommodate four men, one of whom will command and direct, a second will operate the control mechanism of the vehicle, the third will operate the gun, while the fourth will serve as a look-out and may be trained to replace either the gun operator or the vehicle control operator in case of a casualty.

Although it is indicated that the primary purpose of the present invention is of military character, it will be understood that the vehicle, because of its maneuverability, especially in wet or muddy terrain, may find use in agriculture, the gun turret being replaced by appropriate body and seat structure. It is well known that power tractors are difficult to operate in muddy terrain covered by a shallow depth of water, such as in rice paddies. The present vehicle is well adapted for operation on such terrain because of the large traction surface provided by the spherical wheels. As the wheels sink in mud the traction surface is increased, and the net effect is to substantially maintain the traction in spite of development of worse conditions.

Numerous other applications of the invention will be apparent but its greatest field of use at present contemplated is military in character, and is based largely upon its capability of proceeding directly from land to water or vice versa, without any alteration of the vehicle structure and without disabling any of its operating parts.

In practice the parts will be so proportioned that the four wheels will have adequate buoyancy to float the complete vehicle with equipment and personnel, while leaving substantially the whole upper half of each wheel above the water surface. The labyrinths will prevent entry of water through the wheel bearings while the exhaust pipes 33 will extend safely above any possible depth of submergence and their ends will be suitably shrouded. This structure substantially improves the vehicle whether it be put to either military or civilian use.

What is claimed is:

1. An amphibian vehicle comprising a closed body, a chassis supporting said body, at least four substantially spherical wheels closed against the entry of water, means associated with said chassis mounting said wheels for independent oscillation about vertical axes relative to each other and individually controlled self-sufficient power units contained within at least two of said wheels, respectively, for driving the same.

2. A buoyant self-contained power unit for amphibian vehicles comprising a bulbous body; an internal combustion engine mounted in said body; power transmission means within said body interposed between said engine and said body whereby the latter may be driven by said engine; means for subjecting the interior of said body to pressure to prevent the entry of water; and traction means carried by the exterior of said body and effective to drive said body either on land or in water.

3. An armored amphibian vehicle comprising a chassis; four substantially spherical wheels supporting said chassis and sealed against entry of water; and an individually controlled, self-sufficient power unit in each of said wheels for driving the same and disposed to give said vehicle a very low resultant center of gravity.

4. An amphibian vehicle comprising a body; four buoyant wheels for said body; an individually controlled, self-sufficient power unit enclosed within each of said wheels for driving the same; and fin means permanently carried by each of said wheels for propelling said vehicle in water.

5. An amphibian vehicle comprising a body; four buoyant wheels for said body; an internal combustion engine enclosed within each of said wheels for driving the same; means permanently carried by each of said wheels for propelling said vehicle in water; and means for subjecting the interior of each wheel to pressure in excess of atmospheric pressure to prevent entry of water when the wheels are submerged above the wheel bearings.

6. A self-contained power unit for amphibian vehicles comprising a hollow axle; a substantially spherical wheel rotatably mounted on said axle; an internal combustion engine mounted on said axle; transmission means within said wheel for connecting said engine in driving relation to said wheel; the interior of said axle being divided longitudinally into two coextensive chambers forming inlet and exhaust passages communicating with said engine.

7. A self-contained power unit for amphibian vehicles comprising a hollow axle; a substantially spherical wheel rotatably mounted on said axle; an internal combustion engine mounted on said axle; transmission means within said wheel for connecting said engine in driving relation to said wheel; the interior of said axle being divided longitudinally into two chambers forming inlet and exhaust passages communicating with said engine; a packing between said axle and the exterior of said wheel, said axle being ported inwardly of said packing to expose the inner surface thereof to the pressure in one of said chambers.

8. An amphibian vehicle comprising a body, a plurality of buoyant wheels for said body, an internal combustion engine inclosed within one of said wheels for driving the same, means carried by said last-mentioned wheel for propelling said vehicle in water, and means for subjecting the interior of said last-mentioned wheel to pressure in excess of atmospheric pressure to prevent entry of water into said wheel.

9. An amphibian vehicle comprising a body, a plurality of axles carried by said body, buoyant wheels rotatably mounted on said axles, an internal combustion engine inclosed within one of said wheels for driving the same, sealing means between said last-mentioned wheel and the axle therefor, and means for subjecting the interior of said last-mentioned wheel to pressure to prevent the entry of water into said wheel past said sealing means.

10. An amphibian vehicle comprising a body, a supporting chassis for said body, a plurality of axles pivotally mounted upon said chassis, buoyant wheels for supporting said vehicle in water pivotally mounted on said axles, an individually controlled power unit in each of said wheels for driving the same, and fin means carried by each of said wheels for propelling said vehicle in water, said pivotally mounted axles being adapted to turn said wheels to steer said vehicle.

11. An amphibian vehicle comprising a body, a supporting chassis for said body, an axle pivotally mounted on said chassis, a buoyant spherical wheel rotatably mounted on said axle, an individually controlled power unit in said wheel for driving the same, and fin means carried by said wheel for propelling said vehicle in water, said pivotally mounted axle adapted to turn said wheel to steer the vehicle.

12. A self-contained power unit for a vehicle comprising an axle, a wheel rotatably mounted on said axle, an internal combustion engine mounted on said axle, transmission means within said wheel for connecting said engine in driving relation to said wheel, said axle having a passage extending longitudinally therein communicating with said engine, a packing between said axle and the exterior of said wheel, and means establishing communication between said passage and the inner side of said packing to expose the latter to the pressure in said passage.

13. A self-contained power unit for a vehicle having a frame, comprising an axle, a hollow king-pin pivotally connecting said axle to said frame, a wheel rotatably mounted on said axle, an internal combustion engine mounted on said axle, transmission means within said wheel for connecting said engine in driving relation to said wheel, said axle having a passage extending longitudinally therein communicating with said engine, and a conduit extending from said passage and through said hollow king-pin.

14. A self-contained power unit for amphibian vehicles comprising an axle, an internal combustion engine mounted on said axle, a substantially spherical wheel rotatably mounted on said axle, said spherical wheel having a relatively large aperture on one side thereof, a removable driving cover member closing said aperture, and transmission means inter-connecting said internal combustion engine and said driving cover member.

15. A self-contained power unit for amphibian vehicles comprising an axle, an internal combustion engine mounted on said axle, a substantially spherical wheel rotatably mounted on said axle, said spherical wheel having a relatively large aperture on one side thereof, substantially in axial alignment with said axle, a removable driving cover member closing said aperture, and a fluid transmission associated with said driving cover member and connected to said engine to form a driving connection between said engine and said wheel.

16. An amphibian vehicle comprising a body, a plurality of axle devices, means pivoting said axle devices on said body for movement independently of each other about axes at right angles to the longitudinal axis of the body, buoyant substantially spherical wheels rotatably mounted on said axle devices and having a total buoyancy sufficient to support the vehicle upon water, said axle devices being adapted to turn independently of each other to turn said wheels to steer the vehicle, a self-contained power plant inclosed within each of said wheels, a transmission mechanism between each of said plant and its enclosing wheel, independently acting pheripheral traction devices on each said wheel whereby said vehicle may be propelled on land or water, means on each axle device for introducing air under pressure into the interior of each wheel and means in each axle device for conducting the air and exhaust of each said power plant from the interior of each wheel to the atmosphere.

ALLISON R. WILLIAMS.

REFERENCES CITED

The following references are of record in the file of this patent:

UNITED STATES PATENTS

| Number | Name | Date |
|---|---|---|
| 233,086 | Fryer | Oct. 12, 1880 |
| 688,591 | Cary | Dec. 10, 1901 |
| 1,204,758 | Gonsior et al. | Nov. 14, 1916 |
| 2,230,361 | Allen | June 19, 1917 |
| 1,309,928 | Walford | July 15, 1919 |
| 1,357,571 | Knepper | Nov. 2, 1920 |
| 1,905,345 | Dandini | Apr. 25, 1933 |
| 1,932,289 | Jarvis et al. | Oct. 24, 1933 |
| 2,005,628 | Maranville | June 18, 1935 |
| 2,143,115 | Stewart | Jan. 10, 1939 |
| 2,267,254 | Reilley | Dec. 23, 1941 |
| 2,278,215 | Poche | Mar. 31, 1942 |
| 2,287,498 | Scofield | June 23, 1942 |
| 2,308,838 | Thompson | Jan. 19, 1943 |
| 2,321,133 | Davis | June 8, 1943 |
| 2,326,400 | Schuhart | Aug. 10, 1943 |

FOREIGN PATENTS

| Number | Country | Date |
|---|---|---|
| 610,930 | France | June 21, 1926 |